United States Patent
Tusha et al.

(10) Patent No.: US 12,519,685 B2
(45) Date of Patent: Jan. 6, 2026

(54) WINDOWING FOR OTFS-BASED COMMUNICATION SYSTEMS UNDER FRACTIONAL DELAY-DOPPLER AND ADJACENT CHANNEL INTERFERENCE

(71) Applicant: ISTANBUL MEDIPOL UNIVERSITESI TEKNOLOJI TRANSFER OFISI ANONIM SIRKETI, İstanbul (TR)

(72) Inventors: Armed Tusha, İstanbul (TR); Hüseyin Arslan, İstanbul (TR)

( * ) Notice: Subject to any disclaimer, the term of this patent is extended or adjusted under 35 U.S.C. 154(b) by 0 days.

(21) Appl. No.: 18/720,115

(22) PCT Filed: Dec. 29, 2021

(86) PCT No.: PCT/TR2021/051585
§ 371 (c)(1),
(2) Date: Jun. 14, 2024

(87) PCT Pub. No.: WO2023/113711
PCT Pub. Date: Jun. 22, 2023

(65) Prior Publication Data
US 2024/0422046 A1    Dec. 19, 2024

(30) Foreign Application Priority Data

Dec. 17, 2021    (TR) ................ 2021/020288

(51) Int. Cl.
*H04B 1/10*    (2006.01)
*H04L 27/26*    (2006.01)

(52) U.S. Cl.
CPC .......... *H04L 27/26532* (2021.01); *H04B 1/10* (2013.01); *H04L 27/2607* (2013.01); *H04L 27/26526* (2021.01)

(58) Field of Classification Search
CPC ......... H04L 27/26532; H04L 27/26526; H04L 27/2607; H04B 1/10
USPC ......................................................... 375/340
See application file for complete search history.

(56) References Cited

FOREIGN PATENT DOCUMENTS

| KR | 20180100837 A | 9/2018 |
|---|---|---|
| WO | 2014123926 A1 | 8/2014 |
| WO | 2017011455 A1 | 1/2017 |

OTHER PUBLICATIONS

International Search Report for corresponding PCT/TR2021/051585 dated Jul. 20, 2022.
Written Opinion of the International Searching Authority for corresponding PCT/TR2021/051585 dated Jul. 20, 2022.

*Primary Examiner* — Dominic D Saltarelli
(74) *Attorney, Agent, or Firm* — Egbert, McDaniel & Swartz, PLLC

(57) ABSTRACT

Disclosed is a windowing method for OTFS-based wireless signals to mitigate interference due to fractional delay and Doppler cases and to control out-of-band emission. The method provides for suitable windowing mechanisms for the multicarrier orthogonal time frequency space (OTFS) scheme in order to manage out-of-band emission and interference due to the limited time and frequency resolution of the OTFS frame.

3 Claims, 1 Drawing Sheet

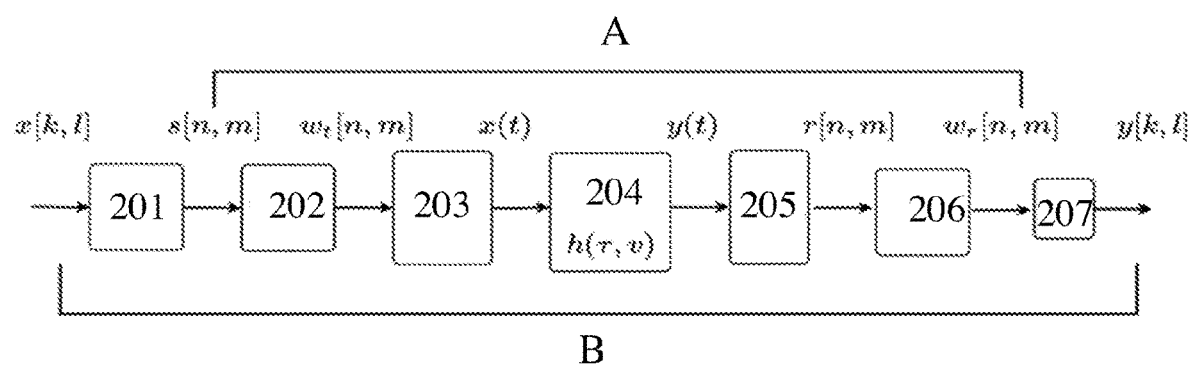

WINDOWING FOR OTFS-BASED COMMUNICATION SYSTEMS UNDER FRACTIONAL DELAY-DOPPLER AND ADJACENT CHANNEL INTERFERENCE

TECHNICAL FIELD

The aim of this invention is to design suitable windowing mechanisms for the multicarrier orthogonal time frequency space (OTFS) scheme in order to manage out-of-band emission and interference due to the limited time and frequency resolution of the OTFS frame.

Thus, the present invention relates to a novel windowing method for OTFS-based wireless signals to mitigate interference due to fractional delay and Doppler cases and to control out-of-band emission.

PRIOR ART

The forthcoming beyond fifth-generation (B5G) or 6G mobile communication systems are highly expected to support much more advanced and complex wireless systems compared with the requirements of fifth-generation (5G) wireless networks with enhanced Mobile Broadband (eMBB), New Radio Lite (NR-Lite), massive Machine Type Communications (mMTC), Ultra-Reliable and Low Latency Communications (URLLC), and Secure URLLC (SUR-LLC). In eMBB, the development of the existing 4G architecture towards a higher data rate had to be facilitated. NR-Lite will supports services with low power consumption and low data rate that address connections between 5G networks and IoT devices such as asset trackers, sensors and wearables. Applications using mMTC need the development of new networks to accommodate the massive connectivity of large numbers of machine users with sporadic transmission, small packets, and limited power consumption. URLLC represent a critical use-case of next generation wireless systems with its stringent requirements for high reliability and low latency. In addition, new services are emerging with not only URLLC requirements but also tight security services called SURLLC, which denotes the most critical use-case. For instance, in high-speed scenarios, i.e., self-driving cars, trains, and flying vehicles, where the speed will be up to 500 km/h. It is worth mentioning that the current orthogonal frequency division multiplexing (OFDM) based systems provide a considerable high spectral efficiency (SE) in case of the time-invariant frequency selective fading wireless enviroments. On the other hand, since the time-variability of the wireless channel and the corresponding Doppler spread are strictly related to the motion of transmitter, receiver or the environment, in such scenarios the performance of OFDM-based systems breaks down completely. In other words, for time-varying wireless channels Doppler effect occurs and causes frequency dispersion, leading to a severe inter-carrier interference (ICI) in conventional OFDM systems.

To cope with the inevitable doubly-dispersive wireless environment, the two-dimensional (2D) modulation scheme named OTFS recently has been proposed in the literature. In contrast to the conventional multi-carrier schemes that utilize time-frequency domain, this multi-carrier technology utilizes the delay-Doppler domain in order to depict the information symbols instead of the time-frequency domain. The most prominent multi-carrier technologies of the wireless realm perform TDM and OFDM that show a significant resilience against time and frequency selectivity of the wireless channel only in a respective manner. Differently, in the delay-Doppler domain and the corresponding OTFS communication, the doubly dispersive wireless channel response is converted into a slowly varying channel response, leading to a time-invariant wireless channel environment.

Despite the aforementioned advantages of OTFS scheme, its resilience against time-variant wireless channel is limited to the time and frequency resolution of OTFS frame. In particular, to have a practical implementation of OTFS frame in the conventional Long-term Evolution (LIE) standard, delay and Doppler spread grid needs to be a multiple of frequency and time inverse resolution. Consequently, we can keep the condition of the quasi-orthogonality in OTFS communication. However, in real life, it is very likely that the wireless channel grid can be represented with parameters being fixed multiples of transmission bandwidth and frame duration, and thus, a severe interference between the delay-Doppler grids occur in the OTFS scheme.

To the best of authors knowledge, this work is the first study that utilizes windowing concept to control the overall error performance of OTFS-based wireless networks under fractional delay-Doppler misalignment. The existing work in the literature; basically concentrates on either reducing the adjacent channel interference or performing power assignment to mitigate interference due to fractional Doppler. Unfortunately, none of these works consider design of proper winding windowing that can mitigate interference due to fractional delay-Doppler to plan and control out-off-band emission.

In the prior art, basically, the solutions that have been discussed by academia and industry consider utilization of conventional windowing schemes that have been used in OFDM systems in order to reduce adjacent channel interference only.

None of the aforementioned windowing techniques are designed considering the impact of fractional delay-Doppler grid in the OTFS transmission. Hence, the impact of these patents in delay-Doppler domain is implacable. Moreover, the conventional schemes only focus on frequency domain.

As a result there is need in the art for a design of proper windowing to control adjacent channel interference and delay-Doppler interference on the 2-D waveform OTFS.

AIM OF THE INVENTION

The main purpose of this invention is to develop a suitable algorithm that can provide a maximum overall system error performance for the users performing OTFS-based communication via exploitation of the channel richness and interference resilience. Consequently, this frame design can play a critical role as an enabler for the inevitable upcoming technologies such as driving autonomous cars, remote surgery, smart city and agriculture as well as intelligent transportation, and thus, improving our life in general.

The aim of the present invention is to take advantage of windowing in OTFS-based communication technologies for 5G and beyond user needs and applications while minimizing the impact of adjacent channel interference and delay-Doppler interference, and consequently maximizing link reliability for a fixed spectral efficiency.

The present invention aims to control out-off band emission in OTFS-based technologies, and thus, to determine the amount of adjacent channel interference leaking into the neighboring users.

Another aim of the invention is to control of interference due to functional delay-Doppler in OTFS systems via sidelobe suppression with the aid of the windowing process.

BRIEF DESCRIPTION OF THE INVENTION

The invention relates to a method for designing windowing mechanisms for the multicarrier orthogonal time frequency (OFTS) scheme to manage out of band emission and interference due to limited time and frequency resolution of the OTFS frame, the method comprises the steps of;
i. Applying N-point inverse Fast Fourier Transform (IFFT) and M-point FFT operation known as Inverse Symplectic Fast Fourier Transform (ISFFT) over the rows and columns of X, respectively,
ii. Applying windowing by converting the data symbols to the time-frequency domain iii. Performing the OTFS transmission by utilizing cyclic prefix (CP) and cyclic suffix (CS) iv. Performing Heisenberg Transform by using M-point IFFT over time-frequency data symbols after which the time OTFS signal undergoes the time-varying wireless channel v. Performing Wigner transform at the receiver side to recover the time-frequency representation of the received signal
vi. Performing windowing at the receiver to control the interference due to fractional delay-Doppler and removing CP-CS
vii. Performing SFFT operation to get the received signal in the delay-Doppler domain viii. Mapping the received symbols to data information after the equalization process With the method according to the present invention; instead of separately performing out-of-band emission and delayed Doppler domain interference reduction, it is possible to accomplish both of these tasks simultaneously through the proposed invention. Thus, the proposed scheme offers a viable application on classical OTFS-based technologies with moderate system complexity. The method according to the present invention is better than the conventional windowing schemes, because it is designed to exploit the features of the 2-D signal representation of the OTFS waveform. Therefore, considering that not only time-windowing but also frequency windowing is needed to control interference in delay-Doppler domain under fraction delay-Doppler scenario, the method of the invention meets the requirements of this scenario.

Also, instead of performing separate out-off band emission and delay-Doppler domain interference mitigation, it is possible to simultaneously complete both of these tasks via the method of the invention. Thus, the proposed scheme offers a feasible implementation on classical OTFS-based technologies with a moderate system complexity.

As a result, OTFS with intelligent windowing design can be viewed as a potential enabler technology for 5G and beyond in the communications realm and the corresponding new needs and applications of NR-Lite, mMTC, eMBB, URLLC and SURLLC.

EXPLANATION OF FIGURES

FIG. 1: Block diagram of the windowing-based OTFS system with fractional delay-Doppler in doubly dispersive channel.
A: Time-frequency domain
B: Delay-Doppler domain
201: ISFFT
202: Transmitter Windowing
203: Heisenberg transform
204: Wireless channel
205: Wigner transform
206: Receiver Windowing
207: SFFT
x[k,l]: k,l-th element of X
s[n,m]: transmitted signal in time-frequency domain
$w_t[n,m]$: transmitter windowing
x(t): transmitted signal in time domain
y(t): received signal in time domain
r[n,m]: received signal in time-frequency domain
$w_r[n,m]$: receiver windowing
y[k,l]: received signal in delay-Doppler domain

DETAILED DESCRIPTION OF THE INVENTION

As mentioned above, the invention relates to a method for designing windowing mechanisms for the multicarrier orthogonal time frequency (OFTS) scheme to manage out of band emission and interference due to limited time and frequency resolution of the OTFS frame, said method comprises the steps of;
i. Applying N-point inverse Fast Fourier Transform (IFFT) and M-point FFT operation known as Inverse Symplectic Fast Fourier Transform (ISFFT) over the rows and columns of X, respectively,
ii. Applying windowing by converting the data symbols to the time-frequency domain
iii. Performing the OTFS transmission by utilizing cyclic prefix (CP) and cyclic suffix (CS)
iv. Performing Heisenberg Transform by using M-point IFFT over time-frequency data symbols after which the time domain OTFS signal undergoes the time-varying wireless channel
v. Performing Wigner transform at the receiver side to recover the time-frequency representation of the received signal
vi. Performing windowing at the receiver to control the interference due to fractional delay-Doppler and removing CP-CS
vii. Performing SFFT operation to get the received signal in the delay-Doppler domain
viii. Mapping the received symbols in delay-Doppler domain to data information after the equalization process In the method of the invention, the system frame consists of N number of symbols and M number of subcarriers with T symbol duration and fa subcarrier spacing (SCS), respectively.

Therefore, the OTFS frame occupies a total bandwidth of $B=Mf_s$ with a frame duration of $T_f=TN$. The data in delay-Doppler domain is given by x[k,l] with k and l index representing Doppler and delay, respectively.

Herein the k,l-th element of X is x[k,l].

In the method of the invention the windowing step is carried out to control the interference due to fractional delay-Doppler impact, and to manage the adjacent channel leakage between neighboring users.

Also, in the method of the invention, windowing is performed over the time-frequency domain with utilization of CP and CS only. The process of windowing at transmitter (iii) and receiver (vi) is a dependent process. Overall, this is not a fixed process but it is an algorithm that is continuously modifiable with respect to the characteristics of time-warying channel For step (iv) of the method of the invention, it is worth mentioning that the length of CP is L length in order to mitigate the inter-symbol interference between the OTFS signals, where L represents the number of channel paths.

The received symbols in delay-Doppler domain are affected by the corresponding wireless channel, and thus, the equalization process is utilized in step (viii) to free the received signal from the impact of the wireless channel. The classical technique that can be used to perform equalization process is minimum mean square error (MMSE) technique. Moreover, all the other equalization techniques for OTFS transmission can be considered for use within this process.

EXAMPLES

Example 1: Application of the Method According to Present Invention

In this work, a system model with single antennas at transmitter (Tx) and receiver (Rx), where FIG. 1 as shown the block diagram of OTFS systems in FIG. 1 is considered. The system frame consists of N number of symbols and M number of subcarriers with T symbol duration and fa sub-carrier spacing (SCS), respectively. Therefore, the OTFS frame occupies a total bandwidth of B=Mf with a frame duration of $T_f$=TN. The data in delay-Doppler domain is given by x[k,l] with k and l index representing Doppler and delay, respectively. Accordingly, we apply N-point inverse Fast Fourier Transform (IFFT) and M-point FFT operation known as Inverse Symplectic Fast Fourier Transform (IS-FFT) over the rows and columns of X, respectively. Note that k,l-th element of X is x[k,l].

B. After we apply ISFFT, we convert the data symbols to the time-frequency domain, where we can apply the windowing in order to control the interference due to fractional delay-Doppler impact, and manage the adjacent channel leakage between neighboring users. We utilize cyclic prefix (CP) and suffix (CS) extensions to perform the windowing process in OTFS-based transmission, as shown in FIG. 1.

C. To generate the time domain OTFS signal, we perform Heisenberg Transform by using M-point IFFT over time-frequency data symbols. It is worth mentioning that the length of CP is L length in order to mitigate the inter-symbol interference between the OTFS signals, where L represents the number of channel paths. After the transmission, the time OTFS signal undergoes the time-varying wireless channel.

At the receiver side, we perform the Wigner transform to recover the time-frequency representation of the received signal. Following that, we perform windowing at the receiver in order to control the interference due to fractional delay-Doppler, and CP-CS is removed, as shown in FIG. 1.

Following that, we perform SFFT operation to get the received signal in the delay-Doppler domain. After the equalization process, we map the received symbols to data information

INDUSTRIAL APPLICABILITY OF THE INVENTION

The invention is applicable to industrialization, and it represents an algorithm that can be applied to any signal performing transmission in delay-Doppler domain.

OTFS with intelligent windowing design according to present invention can be viewed as a potential enabler technology for 5G and beyond in the communications realm and the corresponding new needs and applications of New Radio Lite (NR-Lite), massive Machine Type Communications (mMTC), Mobile Broadband (eMBB), Ultra-Reliable and Low Latency Communications (URLLC) and secure URLLC (SURLLC).

Around these basic concepts, it is possible to develop several embodiments regarding the subject matter of the invention; therefore the invention cannot be limited to the examples disclosed herein, and the invention is essentially as defined in the claims. Separate embodiments of the invention can be combined where appropriate.

It is obvious that a person skilled in the art can convey the novelty of the invention using similar embodiments and/or that such embodiments can be applied to other fields similar to those used in the related art. Therefore it is also obvious that these kinds of embodiments are void of the novelty criteria and the criteria of exceeding the known state of the art.

The invention claimed is:

1. A method for preparing a windowing of a multicarrier orthogonal time frequency (OTFS) signal, the method comprising:
    applying an N-point inverse Fast Fourier Transform (IFFT) and an Inverse Symplectic Fast Fourier Transform (ISFFT) over rows and columns of data;
    converting the IFFT and ISFFT as data symbols to a time-frequency domain;
    utilizing a cyclic prefix (CP) extension and a cyclic suffix (CS) extension in order to perform an OTFS transmission;
    performing an Heisenberg Transform by using the ISFFT over the time-frequency domain data symbols such that the OTFS signal undergoes a time-varying wireless channel;
    performing a Wigner transform at a receiver side in order to recover a time frequency representation of a received signal;
    controlling an interference due to fractional delay-Doppler and removing the CP and the CS at a receiver;
    performing a Symplectic Fast Fourier transform operation in order to produce the received signal in a delay-Doppler domain; and
    mapping the received signal into the data information.

2. The method of claim 1, wherein the rows and columns of data have N number of symbols and M number of subcarriers with a T symbol duration and fa subcarrier spacing.

3. The method of claim 1, wherein the OTFS signal is for use in a 5G system.

* * * * *